Sept. 25, 1951     C. E. STRYKER     2,569,028
PRESSURE BOOSTER AND CONTROL VALVE THEREFOR
Filed March 23, 1946
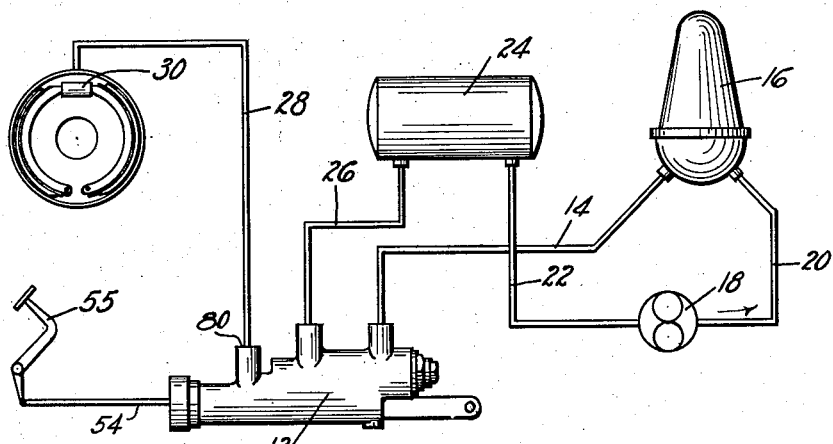
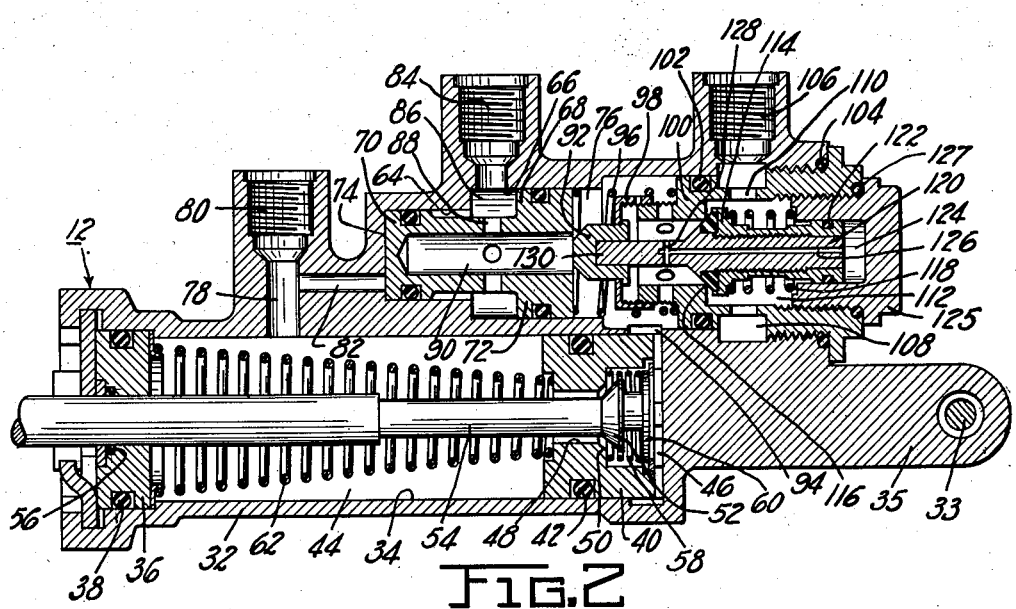
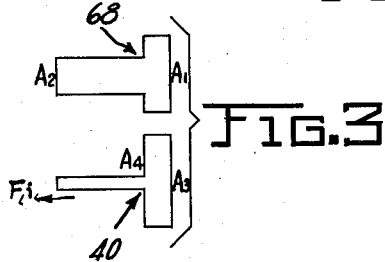
INVENTOR.
CARLETON E. STRYKER
BY
ATTORNEY Patented Sept. 25, 1951

2,569,028

UNITED STATES PATENT OFFICE 2,569,028

PRESSURE BOOSTER AND CONTROL VALVE
THEREFOR

Carleton E. Stryker, Glendale, Calif., assignor to Bendix Aviation Corporation, South Bend, Ind., a corporation of Delaware Application March 23, 1946, Serial No. 656,637

7 Claims. (Cl. 60—54.5)

1

This invention relates to a pressure booster and control valve therefor, the booster being arranged to displace fluid under pressure to operate a motor which performs useful work. More specifically, the invention relates to an improved power-assisted master cylinder useful for developing pressure in a liquid pressure system, such as a brake applying system.

The primary object of the present invention is to provide improved means whereby the force developed by the operator to act on the master cylinder will be assisted by pressure from a suitable pressure source, the utilization of the fluid from the pressure source being under the control of the pressure developed in the master cylinder.

A further object of the present invention is to provide a compact, efficient unit for accomplishing the purpose discussed in the preceding paragraph.

A still further object of the present invention is to provide a master cylinder in which the operator is normally assisted in developing pressure by power means, but which is capable of satisfactory operation by operator developed pressure alone, in case of power failure.

Other objects and advantages of the invention will become apparent in the following description, reference being had therein to the accompanying drawing, in which:

Figure 1 is a diagrammatic illustration of a fluid pressure system incorporating my improved fluid displacing device, or booster;

Figure 2 is a sectional view showing the details of said fluid displacing device; and Figure 3 is a diagram illustrating the operation of the governing principles of the fluid displacing device.

The outline of my improved fluid displacing device, or pressure booster, is indicated in the figures by the numeral 12. As shown in Figure 1, a conduit 14 connects a port of the device 12 to a source of pressure liquid such as the accumulator 16, the accumulator being supplied with liquid under pressure by a pump 18, the delivery side of which is connected to the accumulator by a conduit 20, and the inlet side of which is connected by a conduit 22 to a reservoir 24 which provides a supply of liquid for the system. The reservoir 24 is connected by means of a conduit 26 to a second port provided in the device 12, and a third port in said device is connected by means of a conduit 28 to a motor 30, which is arranged to operate a brake, or other work performing device.

2

The device 12 may be said broadly to consist of a master cylinder and a hydraulically operated power control valve. Although the parts which comprise the device 12 may be separated and provided with individual housings or casings, I prefer, in obtaining a more compact and generally neat construction, to house all the parts of the control device in the single casing 32. This casing may be suspended from a supporting pin 33 by means of an arm 35 formed on the casing. Although the device 12 is illustrated as extending in a horizontal plane, in actual practice its longitudinal dimension is vertical rather than horizontal.

Within the casing 32 is a master cylinder bore 34, closed at one end by a wall 36 which has a suitable sealing member 38 associated therewith. Reciprocable within bore 34 is a piston or pressure responsive movable member 40 provided with the usual seal 42. Piston 40 divides bore 34 into a discharge or outlet chamber 44 and a chamber 46 at the rear of the piston. Passage 48 which extends longitudinally through the piston permits communication between chambers 44 and 46 under certain circumstances. At one end of passage 48, piston 40 is provided with a valve seat 50. A valve element 52 is adapted to cooperate with valve seat 50 to control the opening and closing of passage 48. In the illustrated master cylinder arrangement, valve element 52 is formed integral with a rod 54 which extends through an opening in wall 36 and is connected at its opposite end to a suitable operator operated member, such as pedal lever 55. A seal 56 is provided between rod 54 and the opening through wall 36.

Valve element 52 is normally held away from valve seat 50 by means of a spring 58 which acts on a flange 60 formed on rod 54. A return spring 62 urges piston 40 to its fully retracted position.

As the description proceeds, it will be apparent that the particular form of master cylinder is not vital to the invention. For example, instead of utilizing a master cylinder of the so-called "pull" type, a master cylinder of the "push" type could be used, wherein the rod extends into the cylinder through the chamber at the rear of the cylinder and the rod is under compression rather than tension. Or, a master cylinder of the construction which is conventional for automobiles might be used, i. e., the so-called "barrel" type of master cylinder.

A second bore is provided in casing 32 having a small diameter portion 64 and a large diameter portion 66. A stepped piston 68 is reciprocable in the stepped bore 64—66, said piston having a small diameter head 70 at one end and a large diameter head 72 at the other end. Piston 68 divides the stepped bore into a chamber 74 at the small diameter end and a chamber 76 at the large diameter end. (The chamber 74 is substantially entirely filled by the small diameter end 70 of the piston 68 when the piston is in released position, as shown, and chamber 74 only opens up as piston 68 is moved toward the large diameter chamber 76.)

A passage 78 connects chamber 44 of bore 34 with the outlet or discharge port 80 which in turn is connected to conduit 28. A second passage 82 intersects passage 78 and thus provides intercommunication between chambers 74 and 44. Reservoir port 84 is connected to conduit 26 and opens into an annular space 86 intermediate the ends of piston 68. The space 86 is connected by means of openings 88 in piston 68 and passage 90 in said piston to chamber 76, except when a valve member 92 closes the end of passage 90. Chamber 76 is in permanent communication with chamber 46 through opening 94 in the body of the casing.

A spring 96 normally holds piston 68 in its released position, as shown. Valve element 92, in released position, is held away from the end of passage 90 by means of a retainer 98 screwed on the inner end of a plug member 100 which is screwed into the open end of the casing, suitable seals 102 and 104 being provided between plug 100 and the casing. A port 106, which is connected by means of conduit 14 with the source of pressure liquid, opens into an annular space 108 and thus communicates through openings 110 in plug 100 with a chamber 112. The chamber 112 is normally cut off from chamber 76 by means of a valve element 114 which seats at 116, but chambers 112 and 76 communicate with one another whenever valve member 114 moves away from its seat 116. Valve member 114 is normally held seated by means of a spring 118 and also by means of a pressure differential between the liquid in chamber 112, which is at the pressure of the liquid in the pressure source, and the liquid in chamber 76, which is connected to the low pressure reservoir. However, in order to lessen the force required to move valve element 114 away from its seat, a plunger-like extension 120 is provided on said valve element to reduce the effective area of the valve element on which the aforementioned pressure differential acts, extension 120 carrying a suitable seal 122 to prevent communication between chamber 112 and the chamber 124 provided at one end of plunger 120. Chamber 124 is located in a plug 125, which is screwed into hollow plug 100, a seal 127 being provided. A longitudinal passage 126 and an intersecting passage 128 provided in valve element 114 and its extension 120 interconnect chambers 76 and 124. A stem 130 on valve element 114 engages valve element 92, as shown.

Operation of the device is as follows. In released position, as shown, chambers 44, 46, 74, and 76 are all in communication with the reservoir 24, and valve element 114 is seated to cut off the pressure source. When the operator desires to apply the brakes, he exerts a force which causes rod 54 to move in the direction of wall 36, first bringing valve element 52 to its seat 50 and thereafter drawing piston 40 on its pressure stroke. After valve element 52 is seated, chamber 44 is cut off from the reservoir, and movement of the piston 40 against the resistance of spring 62 displaces fluid under pressure through passage 78 and port 80 to motor 30, causing the same to do useful work, such as applying brakes.

The pressure developed in chamber 44 is also transmitted through passage 82 to chamber 74. When the pressure against the small diameter end 70 of piston 68 is sufficient to overcome spring 96, piston 68 moves toward valve element 92. When valve element 92 seats on the end of the piston, passage 90 is cut off, and chamber 76 is disconnected from reservoir 24 (chamber 46 is also disconnected from the reservoir by this action). Further movement of piston 68 causes valve element 92 to push on stem 130 of valve element 114 and lift valve element 114 from its seat. This permits pressure liquid from the pressure source to flow from chamber 112 into chamber 76 and thence into chamber 46. The pressure of liquid in chamber 46 acts against the rear of piston 40 and assists the operator in forcing said piston 40 on its pressure stroke. At the same time, the pressure liquid in chamber 76 acts against the large diameter end 72 of piston 68 tending to return piston 68 to its released position. It will also be noted that the pressure in chamber 76 is communicated to chamber 124 so that the increase of pressure tending to hold valve 114 open will be counteracted by an increase of pressure tending to close said valve. If piston 72 returns sufficiently to permit valve element 114 to seat, but not sufficiently to unseat valve element 92, the valve is said to be in lapped position and the pressure in chambers 76 and 44 will be held constant. Further application of force through rod 54 will thereafter be required to increase the pressure acting on piston 40.

When it is desired to release the pressure in motor 30, the operator developed force on rod 54 is removed. Because of the action of spring 58, and because the pressure in chamber 44 is higher than that in chamber 46, valve element 52 will move away from valve seat 50, and chamber 44 will communicate with chambers 46 and 76, causing equalization of pressure in said three chambers. The increase of pressure in chamber 76 acting against the large diameter end of piston 68 will move piston 68 to released position, reopening passage 90 and bringing the chambers 44, 46, 74 and 76 once again into communication with reservoir 24.

In case of power failure, that is, if for some reason fluid under pressure is not available to assist rod 54 in drawing piston 40 on its pressure stroke, then piston 68 will move only far enough to bottom plunger 120 against the end wall of chamber 124, and thereafter all liquid displaced from chamber 44 will act on motor 30 to develop pressure therein. Although the entire pressure will have to be developed by the operator, the loss of power will not prevent a full application of the brake (or other device) controlled by motor 30.

An analysis of the relationship of the various forces acting in the combined master cylinder and power valve device is in order, since certain principles must be followed in order to provide a satisfactory and operable device. In other words, there are certain rules which must be followed in selecting the areas of the opposed pressure responsive surfaces of pistons 40 and 68.

Referring to Figure 3, assume that $A_1$ is the effective area of the pressure responsive surface at the large diameter end of piston 68, and that $A_2$ is the effective area of the pressure responsive surface at the small diameter end of piston 68. Further assume that $A_3$ is the full area of the pressure responsive surface provided at the rear of piston 40 when valve 52 is seated, and assume that $A_4$ is the effective area of the forward pressure responsive surface of piston 40, this area being represented by the annular area constituting the difference between the full area of piston 40 and the cross-sectional area of rod 54. If we take $F_i$ as the initial force exerted manually through rod 54 on piston 40, and $F_r$ as the resultant force developed by power and manual effort acting together on piston 40, then it will be seen that the resultant $F_r$ of the force acting on piston 40 is a summation of the initial force $F_i$ plus a series of boost increments which can be expressed in an infinite series $$-F_r = F_i(1 + C + C^2 + C^3 + \ldots + C^n)$$

C representing a constant which will hereinafter be defined.

The initial force $F_i$ develops $F_i/A_4$ unit pressure in the master cylinder chamber 44. This pressure acting on $A_2$ is the actuating force for the valve and is balanced by an equal and opposite force due to pressure on $A_1$. The unit pressure entering chamber 46 of the master cylinder from the power valve is equal to $$\frac{F_i A_2}{A_4 A_1}$$

The boosted force then is $$F_i \frac{A_3 A_2}{A_4 A_1}$$

This force also experiences a boost and its resultant force is again boosted with the cycle going on indefinitely. If we let $$\frac{A_3 A_2}{A_4 A_1}$$

equal the constant C, then the boost due to $F_i$ equals $F_i C$, the boost due to $F_i C$ equals $F_i C^2$; the boost due to $F_i C^2$ equals $F_i C^3$, and the boost due to $F_i C^3$, and the boost due to $F_i C^{n-1}$ equals $F_i C^n$. The resultant force is therefore equal to the summation of these boosted forces or $$F_r = F_i (1 + C + C^2 + C^3 + \ldots + C^n)$$

If C is equal to or greater than 1, there will be no controlled pressure in the motor, but an immediate surge to the limiting pressure. Therefore, it is necessary that the ratio of the product of $A_3 \times A_2$ to the product of $A_4 \times A_1$ be less than 1. Stated another way, the product of the effective area of the rear surface of piston 40 times the effective area of the forward surface of piston 68 must not be equal to or greater than the product of the effective area of the forward surface of piston 40 times the effective area of the rear surface of piston 68. In the illustrated form of the device, since the rod 54 extends through the forward end of the master cylinder, the pressure responsive forward surface of piston 40 ($A_4$) is necessarily less than the pressure responsive rear surface of piston 40 ($A_3$). This means that the ratio of $$\frac{A_3}{A_4}$$

is greater than 1, and in order that the constant C shall be less than 1, the ratio $$\frac{A_2}{A_1}$$

must be somewhat less than 1, and therefore the piston 68 must be stepped in diameter, as shown. However, if the rod acting on piston 40 were inserted from the rear of the master cylinder, $A_3$ would be less than $A_4$ and it would be possible to use a piston 68 having the same diameter at both ends or in such a base, if the cross-sectional area of rod 54 were large enough, the forward surface of piston 68 might even be made somewhat larger than the rearward surface of piston 68. However, the cross-sectional area of the rod is generally so small as to be almost negligible. Assuming that the area of rod 54 is neglected, the relationship between the ratio $$\frac{A_2}{A_1}$$

and the power boost ratio is as shown by the following chart.

| $\frac{A_2}{A_1}$ | Power Boost Ratio |
| --- | --- |
| 0 | 1 |
| 1/8 | 1½ |
| 1/2 | 2 |
| 3/8 | 2½ |
| 2/3 | 3 |
| 5/7 | 3½ |
| 3/4 | 4 |
| 4/5 | 5 |
| 5/6 | 6 |
| 6/7 | 7 |
| 7/8 | 8 |

It will be noted in connection with the above discussion that the effect of the various springs in the power assisted master cylinder is not taken into account in computing the sizes of the piston surfaces. Since the springs all act in a direction tending to release the built up pressure, this constitutes a safety factor which insures against uncontrollability even though the power boost ratio is placed at or near the maximum. However, it will not usually be desirable to provide a device having too high a power ratio, and thus far I have preferred to use a control device having approximately a two to one ratio of total pressure on piston 40 to force exerted by rod 54 alone.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a hydraulic pressure system including a reservoir, a pump having its inlet connected to the reservoir, and a motor adapted to be actuated by hydraulic pressure; a unit for controlling the operation of the motor comprising a casing, a first bore in said casing, a piston reciprocable therein having a passage therethrough, a return spring urging said piston toward retracted position, an operator operated rod adapted to move said piston on its pressure stroke, a valve carried by the rod and arranged to close the passage through the piston and thereafter transmit force from the rod to the piston to displace fluid from said first bore, conduit means adapted to connect said first bore to the motor, a second bore in the casing parallel to the first, a stepped piston reciprocable in said second bore, a first and second chamber formed at the small diameter and large diameter ends respectively of said stepped piston, conduit means connecting said first chamber to the motor-connected-end of the first bore whereby the small diameter end of the stepped piston is acted on by the pressure developed in said first bore, spring means urging said stepped piston toward said first chamber, a reservoir port which admits liquid from the reservoir to the casing intermediate the ends of the stepped piston, a passage in said stepped piston arranged to connect the reservoir with said second chamber, conduit means interconnecting said second chamber with the first bore at the rear of the first bore piston, a third chamber in the casing communicating with the delivery side of the pump, a normally seated first valve element controlling communication between said third chamber and said second chamber, a second valve element caused by movement of the stepped piston toward the second chamber to close the passage in the stepped piston and cut off the second chamber and the rear of the first bore from the reservoir, and a stem on said first valve element acted on by further movement of the stepped piston toward the second chamber to unseat said first valve element and permit the flow of liquid under pressure into the second chamber and thence into the first bore behind the first bore piston, the pressure of said liquid at the rear of the first bore piston assisting the operator in developing pressure to be transmitted to the motor, and the pressure of said liquid in the second chamber acting against the large diameter end of the stepped piston to urge it toward the first chamber.

2. For use in a hydraulic pressure system including a reservoir, a pump having its inlet connected to the reservoir, and a motor adapted to be actuated by hydraulic pressure; a unit for controlling the operation of the motor comprising a casing, a first bore in said casing, a piston reciprocable therein having a passage therethrough, a return spring urging said piston toward retracted position, an operator operated rod adapted to move said piston on its pressure stroke, a valve carried by the rod and arranged to close the passage through the piston and thereafter transmit force from the rod to the piston to displace fluid from said first bore, conduit means adapted to connect said first bore to the motor, a second bore in the casing parallel to the first, a stepped piston reciprocable in said second bore, a first and second chamber formed at the small diameter and large diameter ends respectively of said stepped piston, conduit means connecting said first chamber to the motor-connected-end of the first bore whereby the small diameter end of the stepped piston is acted on by the pressure developed in said first bore, spring means urging said stepped piston toward said first chamber, a reservoir port which admits liquid from the reservoir to the casing intermediate the ends of the stepped piston, a passage in said stepped piston arranged to connect the reservoir with said second chamber, conduit means interconnecting said second chamber with the first bore at the rear of the first bore piston, a third chamber in the casing communicating with the delivery side of the pump, a normally seated first valve element controlling communication between said third chamber and said second chamber, a second valve element caused by movement of the stepped piston toward the second chamber to close the passage in the stepped piston and cut off the second chamber and the rear of the first bore from the reservoir, a stem on said first valve element acted on by further movement of the stepped piston toward the second chamber to unseat said first valve element and permit the flow of liquid under pressure into the second chamber and thence into the first bore behind the first bore piston, the pressure of said liquid at the rear of the first bore piston assisting the operator in developing pressure to be transmitted to the motor, the pressure of said liquid in the second chamber acting against the large diameter end of the stepped piston to urge it toward the first chamber, and an extension on said first valve element projecting in the opposite direction from the aforementioned stem and arranged to bottom on the casing after a predetermined movement of the stepped piston.

3. A device for controlling the operation of a fluid pressure motor comprising a first bore communicating with the motor to deliver liquid under pressure thereto, a piston reciprocable in said bore having a passage therethrough, a return spring urging said piston toward retracted position, an operator operated rod adapted to move said piston on its pressure stroke, a valve carried by the rod and arranged to close the passage through the piston and thereafter transmit force from the rod to the piston to displace liquid from said first bore, a second bore, a stepped piston reciprocable in said second bore, a first and second chamber formed at the small diameter and large diameter ends respectively of said stepped piston, said first chamber being in communication with the discharge end of the first bore whereby said stepped piston is acted on by the pressure developed in said first bore, spring means urging said stepped piston toward said first chamber, a reservoir port which admits liquid from a reservoir to said second bore intermediate the ends of the stepped piston, a passage in said stepped piston arranged to connect the reservoir port with said second chamber, said second chamber being in communication with the first bore at the rear of the first bore piston, a third chamber communicating with a pressure liquid source, a normally closed first valve element controlling communication between said third chamber and said second chamber, a second valve element associated with the passage in the stepped piston to control communication between the second chamber and the reservoir, said second valve element being closed and said first valve element opened when the stepped piston moves toward the second chamber, thereby admitting liquid under pressure into the second chamber and thence into the first bore behind the first bore piston, the pressure of said liquid at the rear of the first bore piston assisting the operator in developing pressure in the discharge end of the first bore, the pressure of said liquid in the second chamber acting against the large diameter end of the stepped piston to urge it toward the first chamber, and an extension on said first valve element arranged to bottom after a predetermined movement of the stepped piston.

4. A device for controlling the operation of a motor comprising a first bore communicating with the motor to deliver liquid under pressure thereto, a piston reciprocable in said bore having a passage therethrough, a return spring urging said piston toward retracted position, an operator operated rod adapted to move said piston on its pressure stroke, a valve carried by the rod and arranged to close the passage through the piston and thereafter transmit force from the rod to the piston to displace liquid from said first bore, a second bore, a stepped piston reciprocable in said second bore, a first and second chamber formed at the small diameter and large diameter ends respectively of said stepped piston, said first chamber being in communication with the discharge end of the first bore whereby said stepped piston is acted on by the pressure developed in said first bore, spring means urging said stepped piston toward said first chamber, a reservoir port which admits liquid from a reservoir to said second bore intermediate the ends of the stepped piston, a passage in said stepped piston arranged to connect the reservoir port with said second chamber, said second chamber being in communication with the first bore at the rear of the first bore piston, a third chamber communicating with a pressure liquid source, a normally closed first valve element controlling communication between said third chamber and said second chamber, a second valve element associated with the passage in the stepped piston to control communication between the second chamber and the reservoir, said second valve element being closed and said first valve element opened when the stepped piston moves toward the second chamber, thereby admitting liquid under pressure into the second chamber and thence into the first bore behind the first bore piston, the pressure of said liquid at the rear of the first bore piston assisting the operator in developing pressure in the discharge end of the first bore, and the pressure of said liquid in the second chamber acting against the large diameter end of the stepped piston to urge it toward the first chamber.

5. A device for displacing fluid under pressure comprising a first bore, a first piston reciprocable in said bore, operator operated means adapted to move said piston on its pressure stroke, a second bore, a second piston reciprocable in said second bore, a first and second chamber formed at the opposite ends of said second piston, said first chamber being in communication with the discharge end of the first bore whereby said second piston is acted on by the pressure developed in said first bore, said second chamber being in communication with the first bore at the rear of said first piston, a third chamber communicating with a source of pressure, a normally closed valve controlling communication between said third chamber and said second chamber, said valve being caused to open when said second piston moves toward the second chamber, thereby admitting fluid under pressure into the second chamber and thence into the first bore behind said first piston, the pressure of said fluid at the rear of said first piston assisting the operator in developing pressure in the discharge end of the first bore, and the pressure of said fluid in the second chamber acting against one end of said second piston to urge it toward the first chamber.

6. A device for displacing liquid under pressure comprising a first pressure responsive movable member having opposed pressure responsive surfaces, operator operated means for actuating said first pressure responsive movable member to displace liquid under pressure from said device, one of the pressure responsive surfaces of said member being subject to the reaction of the pressure of said displaced liquid, a second pressure responsive movable member having opposed pressure responsive surfaces, one of which is acted on by the pressure of the aforementioned liquid displaced by the first pressure responsive movable member, and valve means under the control of said second pressure responsive movable member to cause liquid from a pressure source to act against the second pressure responsive surface of the first pressure responsive movable member, thereby assisting the operator in actuating the same, and also to act against the second pressure responsive surface of said second pressure reponsive movable member to tend to return the valve means to its original status, the product of the effective area of the second pressure responsive surface of the first pressure responsive movable member times the effective area of the first pressure responsive surface of the second pressure responsive movable member being less than the product of the effective area of the first pressure responsive surface of the first pressure responsive movable member times the effective area of the second pressure responsive surface of the second pressure responsive movable member.

7. A device for displacing fluid under pressure comprising a first pressure responsive movable member having opposed pressure responsive surfaces, operator operated means for actuating said first member to displace fluid under pressure from said device, the first of said surfaces being subject to the reaction of the pressure of said displaced fluid, a second pressure responsive movable member having opposed pressure responsive surfaces, one of which is acted on by the pressure of the aforementioned fluid displaced by the first member, and valve means under the control of said second member to cause fluid from a pressure source to act against the second surface of the first member, thereby assisting the operator in actuating the same, and also to act against the second surface of said second member to tend to return the valve means to its original status, the product of the effective area of the second surface of the first member times the effective area of the first surface of the second member being less than the product of the effective area of the first surface of the first member times the effective area of the second surface of the second member.

CARLETON E. STRYKER.

REFERENCES CITED

The following references are of record in the file of this patent:

UNITED STATES PATENTS

| Number | Name | Date |
|---|---|---|
| 1,472,801 | Loughead | Nov. 6, 1923 |
| 1,903,973 | Boughton | Apr. 18, 1933 |
| 2,361,419 | Schnell | Oct. 31, 1944 |